(12) United States Patent
ter Horst (10) Patent No.: US 12,076,680 B1
(45) Date of Patent: Sep. 3, 2024

(54) AIR FILTER WITH DIFFERENT DIAMETER GLUE BEADS

(71) Applicant: Filtration Advice, Inc., Boca Raton, FL (US)

(72) Inventor: Dirk ter Horst, Boca Raton, FL (US)

(73) Assignee: Filtration Advice, Inc., Boca Raton, FL (US)

(*) Notice: Subject to any disclaimer, the term of this patent is extended or adjusted under 35 U.S.C. 154(b) by 0 days.

(21) Appl. No.: 18/131,514

(22) Filed: Apr. 6, 2023

(51) Int. Cl.
*B01D 46/00* (2022.01)
*B01D 46/10* (2006.01)
*B01D 46/52* (2006.01)

(52) U.S. Cl.
CPC ....... *B01D 46/523* (2013.01); *B01D 46/0001* (2013.01); *B01D 46/0002* (2013.01); *B01D 46/10* (2013.01)

(58) Field of Classification Search
CPC ........ B01D 46/00; B01D 24/00; B01D 39/00; B01D 27/06; A61F 13/15
USPC ...... 55/521, 381; 156/204; 210/493.1, 493.5
See application file for complete search history.

(56) References Cited

U.S. PATENT DOCUMENTS

| | | | |
|---|---|---|---|
| 3,871,851 A * | 3/1975 | Neumann | B01D 46/10 55/500 |
| 5,066,400 A * | 11/1991 | Rocklitz | B01D 29/012 210/493.5 |
| 5,071,555 A | 12/1991 | Enbom | |
| 7,625,418 B1 * | 12/2009 | Choi | B01D 29/07 210/493.1 |
| 9,061,234 B2 * | 6/2015 | Lundquist | B01D 46/523 |
| 9,452,378 B2 * | 9/2016 | Jackson | B01D 46/543 |
| 10,188,978 B2 * | 1/2019 | Krull | B01D 46/527 |
| 10,730,001 B2 * | 8/2020 | Tate | B01D 46/523 |
| 10,953,360 B2 * | 3/2021 | Ouyang | B01D 46/527 |
| 11,364,462 B2 * | 6/2022 | Sala | B01D 46/525 |
| 2005/0139544 A1 * | 6/2005 | Choi | B01D 46/523 210/493.1 |
| 2013/0219844 A1 * | 8/2013 | Sullivan | B01D 46/522 55/496 |
| 2015/0007539 A1 | 1/2015 | Mbadinga-Mouanda et al. | |
| 2016/0067647 A1 * | 3/2016 | Tate | B01D 46/10 156/219 |
| 2021/0129068 A1 | 5/2021 | Canfield et al. | |

(Continued)

FOREIGN PATENT DOCUMENTS

DE 8617256 U1 12/1986
DE 29807580 U1 9/1998

(Continued)

OTHER PUBLICATIONS

International Search Report and Written Opinion dated May 28, 2024 for corresponding application PCT/US2024/023228.

*Primary Examiner* — Minh Chau T Pham
(74) *Attorney, Agent, or Firm* — Bachman & LaPointe, P.C.

(57) ABSTRACT

An air filter includes an air filter pack having air filtration media folded along fold lines to define adjacent walls separated by connecting peaks at the fold lines; and a plurality of adhesive beads extending substantially perpendicular to the fold lines, wherein the plurality of adhesive beads has different bead thicknesses, and/or different segment lengths. The air filter can include a frame holding the filter pack. A method is also disclosed.

25 Claims, 4 Drawing Sheets

(56) References Cited

U.S. PATENT DOCUMENTS

| | | | | |
|---|---|---|---|---|
| 2023/0182059 A1* | 6/2023 | Horiye | ............... | B01D 46/0001 55/521 |
| 2023/0324059 A1* | 10/2023 | Wiser, III | .......... | B01D 46/0036 55/385.2 |

FOREIGN PATENT DOCUMENTS

| | | | | |
|---|---|---|---|---|
| DE | 19755466 A1 * | 6/1999 | ............. | B01D 46/52 |
| JP | 2002233725 A | 8/2002 | | |

\* cited by examiner

AIR FILTER WITH DIFFERENT DIAMETER GLUE BEADS

BACKGROUND OF THE INVENTION

The invention relates to air filtration and, more particularly, to an air filter of the type which has filter media that is folded and enclosed in a frame.

Air filters can include a filter media that is arranged into suitable filtering structure such as a zig-zag pattern, and the resulting structure can be mounted into a frame to define an air filter that can be useful in numerous air treatment capacities such as HVAC systems and the like. During manufacture, a plurality of glue beads are applied along the filter, generally perpendicular to the fold lines, and these glue beads help to give the air filter structural strength when placed in use, for example being placed across a flow of air to be filtered.

Such filters are somewhat ubiquitous and function well to filter air or other gaseous medium. However, manufacture of such filters can be costly in terms of machinery, labor and raw materials.

The need remains for an air filter that can be manufactured at reduced costs.

SUMMARY OF THE INVENTION

The present disclosure relates to an air filter and a method for making an air filter wherein adhesive is applied to the filter media during manufacture in a series of generally parallel beads, and wherein the parallel beads can have different thicknesses or diameters, for example with less adhesive being applied at edges of the filter media which will be close to a frame structure and therefore require less reinforcement from the adhesive. By applying thinner glue beads, for example at sides or other areas where less structural reinforcement is needed, the cost for adhesive, as well as the use of this raw material, can be reduced. The resulting filter has filter media enclosed in a frame, with adhesive beads of different thickness, for example with the adhesive beads nearest to the frame walls being smaller than those in other areas, for example the center of the filter pack.

In one non-limiting embodiment, an air filter, comprises an air filter pack comprising air filtration media folded along fold lines to define adjacent walls separated by connecting peaks at the fold lines; and a plurality of adhesive beads extending substantially perpendicular to the fold lines, wherein the plurality of adhesive beads have different bead thicknesses.

In one non-limiting configuration, the plurality of adhesive beads join adjacent peaks together.

In another non-limiting configuration, the air filter pack is enclosed in a frame having walls, and wherein adhesive beads of the plurality of adhesive beads that are closer to the walls of the frame have a smaller bead thickness than those that are further from the walls of the frame.

In still another non-limiting configuration, the walls of the frame include a first pair of walls that extend generally parallel to the plurality of adhesive beads and a second pair of walls that extend generally perpendicular to the plurality of adhesive beads.

In a further non-limiting configuration, the plurality of adhesive beads extend along a length from one edge of the filter pack parallel to the fold lines to an opposite edge of the filter pack parallel to the fold lines, and wherein each adhesive bead of the plurality of adhesive beads has a substantially constant thickness along the length.

In a still further non-limiting configuration, the plurality of adhesive beads extend along a length from one edge of the filter pack parallel to the fold lines to an opposite edge of the filter pack parallel to the fold lines, and wherein at least one adhesive bead of the plurality of adhesive beads has a thickness that changes along the length.

In another non-limiting configuration, the at least one adhesive bead has a thickness that is thinner close to the one edge or the opposite edge.

In still another non-limiting configuration, the different bead thicknesses are different at parallel locations located along the fold lines.

In a further non-limiting configuration, the plurality of adhesive beads comprise continuous beads of adhesive extending along a length of the filter pack.

In a still further non-limiting configuration, the plurality of adhesive beads are defined by a row of dots or segments of adhesive extending along a length of the filter pack.

In another non-limiting configuration, the air filter pack defines an upstream facing side and a downstream facing side, and wherein the plurality of substantially parallel beads extend along both the upstream facing side and the downstream facing side.

In still another non-limiting configuration, the plurality of substantially parallel beads on the downstream facing side have a greater thickness than the plurality of substantially parallel beads on the upstream facing side.

In another non-limiting embodiment, a method for making an air filter, comprises applying a plurality of substantially parallel adhesive beads to a flat filter media, wherein the plurality of adhesive beads have different thicknesses from each other; and folding the flat air filtration media to form an air filter pack comprising air filtration media folded along fold lines to define adjacent walls separated by connecting peaks at the fold lines, wherein the plurality of adhesive beads extend substantially perpendicular to the fold lines and join adjacent peaks together.

In a non-limiting configuration of this embodiment, the applying step is a continuous process conducted on a moving web of flat air filtration media having side edges, and wherein the plurality of adhesive beads extend along the moving web of flat air filtration media substantially parallel to the side edges.

In another non-limiting configuration, adhesive beads that are closer to the side edges have a smaller bead thickness than adhesive beads that are further from the side edges.

In still another non-limiting configuration, the method further comprises positioning the filter pack in a filter frame having parallel sides with respect to the adhesive beads, and perpendicular sides with respect to the adhesive beads, wherein adhesive beads that are closer to the parallel sides have a smaller bead thickness than adhesive beads that are further from the parallel sides.

In a further non-limiting configuration, the applying step comprises applying the plurality of adhesive beads using variable flow adhesive nozzles.

In a still further non-limiting configuration, the thickness of the plurality of adhesive beads increases from one side edge to a center of the filter pack, and then decreases from the center to the other side edge of the filter pack.

In another non-limiting configuration, the plurality of adhesive beads extend along a length of the flat filter media from one edge of the flat filter media that is parallel to the fold lines to an opposite edge of the flat filter media that is parallel to the fold lines, and wherein each adhesive bead of the plurality of adhesive beads has a substantially constant thickness along the length.

In still another non-limiting configuration, the plurality of adhesive beads extend along a length of the flat filter media from one edge of the flat filter media that is parallel to the fold lines to an opposite edge of the filter media that is parallel to the fold lines, and wherein each adhesive bead of the plurality of adhesive beads has a thickness that changes along the length.

In a further non-limiting configuration, the at least one adhesive bead has a thickness that is thinner close to the one edge or the opposite edge than it is along central portions of the at least one adhesive bead.

In a still further non-limiting configuration, the different bead thicknesses are different at parallel locations located along the fold lines.

In another non-limiting configuration, the plurality of adhesive beads comprise continuous beads of adhesive extending along a length of the filter pack.

In still another non-limiting configuration, the plurality of adhesive beads are defined by a row of dots or segments of adhesive extending along a length of the filter pack.

In a further non-limiting configuration, the air filter pack defines an upstream facing side and a downstream facing side, and wherein the plurality of substantially parallel beads extend along both the upstream facing side and the downstream facing side.

In a still further non-limiting configuration, the plurality of substantially parallel beads on the downstream facing side have a greater thickness than the plurality of substantially parallel beads on the upstream facing side.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

A detailed description of non-limiting embodiments of the present disclosure follows, with reference to the attached drawings, wherein.

DETAILED DESCRIPTION

Figure 1:
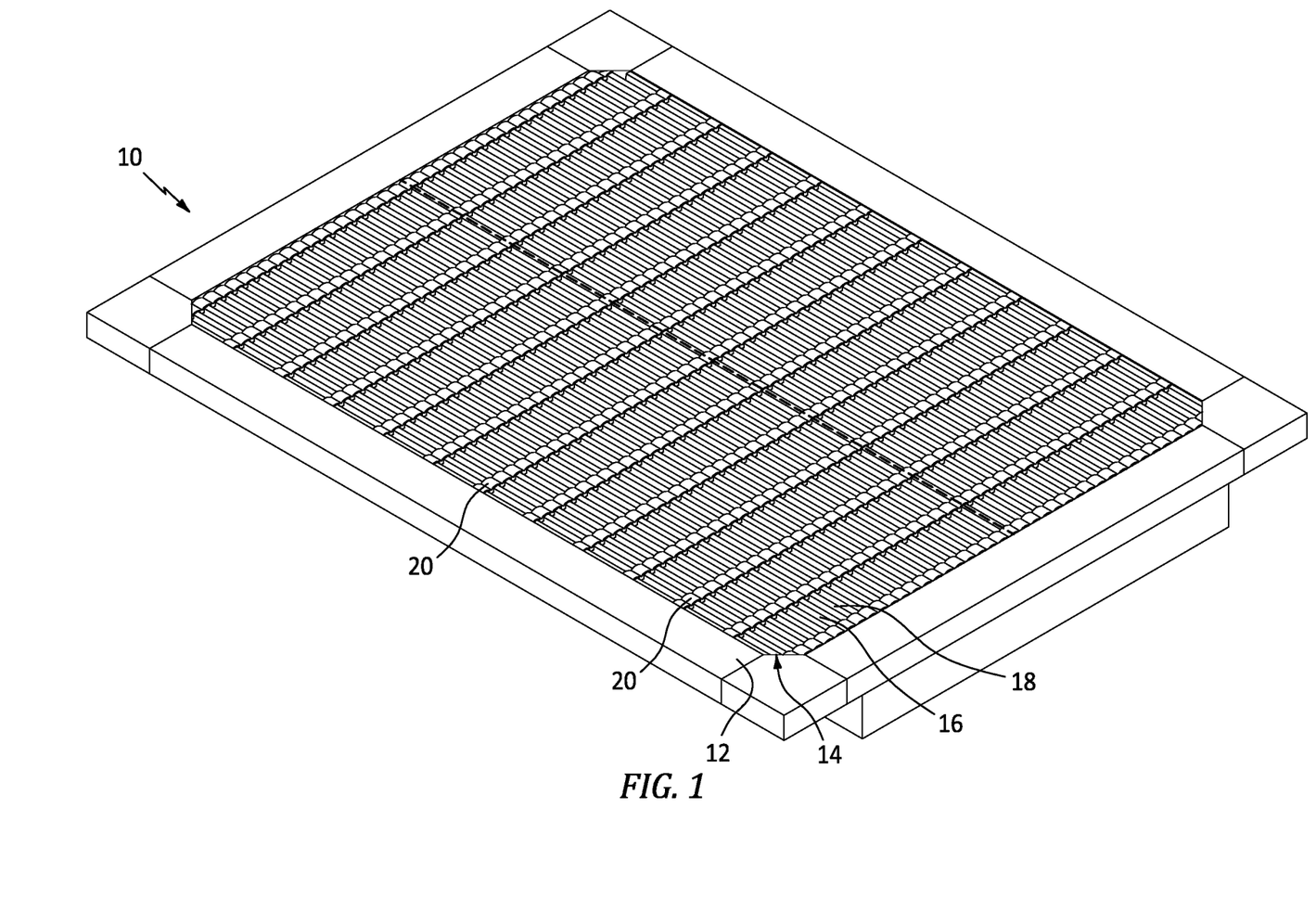
FIG. 1 illustrates a filter having folded walls and a plurality of adhesive beads.

The invention relates to an air filter and to a method for making same wherein adhesive or glue beads that are used to help the folded filter pack hold shape are applied in differing thicknesses, for example with less glue near frame walls where it is not needed. FIG. 1 schematically illustrates a filter 10 having a frame 12 and a folded filter pack 14 contained within frame 12.

Folded filter pack 14 can typically be an air filtration media that is folded in a zig zag pattern defining a plurality of adjacent walls 16 that are joined by alternatingly upward and downward extending peaks 18. This increases surface area such that when the filter pack is placed across a flow of air, the filtering effectiveness of the filter pack is improved by the increased surface area.

When in use, the filter pack is exposed to a pressure drop, that is, there is generally a greater pressure upstream or into the direction from which the flow is coming, as compared to downstream of the filter, where filtered air or other gaseous medium flows after passing the filter. Further, this pressure drop can increase as the filter media collects matter from the flow through the filter.

This pressure drop can cause unsupported filter packs to deform away from the higher-pressure side and thereby greatly interfere with the flow characteristics of the air filter.

In order to help the filter pack resist deformation during use, a plurality of glue or adhesive beads 20 can be applied along the filter, generally perpendicular to the fold lines or peaks 18. Adhesive beads 20 can bond or hold adjacent peaks 18 together and help filter pack 14 to hold its shape. FIG. 1 shows one side of filter 10, but it should be appreciated that adhesive beads can be positioned along the other side of the filter as well.

Figure 2:
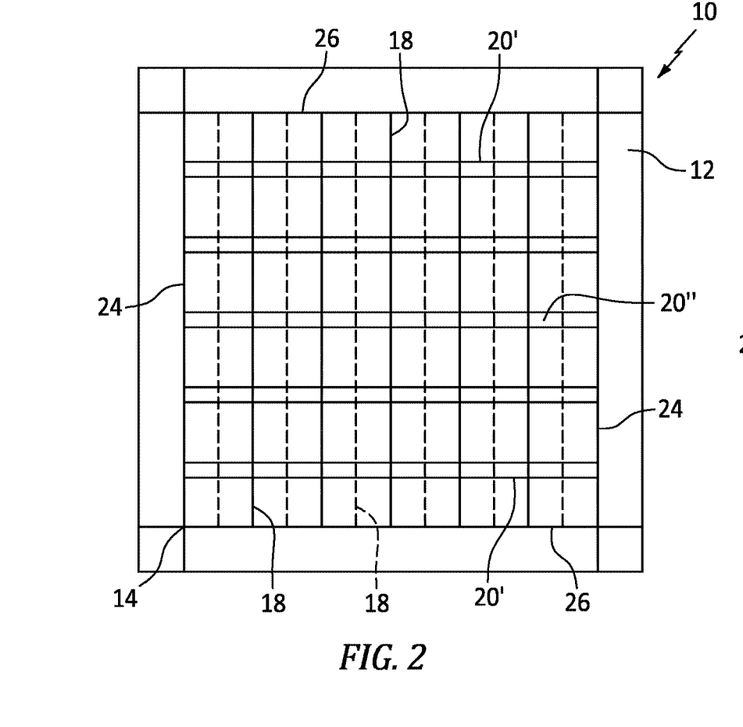
FIG. 2 is a top view of a filter according to one disclosed embodiment.

FIG. 2 shows a simplified schematic top view of a filter 10 such as that of FIG. 1, but showing fewer adhesive beads than are included in the illustration of FIG. 1 for purposes of simplicity. Thus, in the embodiment shown in FIG. 2, there are five (5) substantially parallel adhesive beads 20. Frame 12 holds filter pack 14, and has two sides 24 that are substantially parallel to fold lines or peaks 18 of filter pack 14, and two sides 26 that are substantially perpendicular to fold lines or peaks 18 of filter pack 14.

As shown, adhesive beads 20 can extend from one side 24 to the other side 24, generally parallel to sides 26. Further, it has been found to be advantageous that of the plurality of adhesive beads 20, beads 20' that are closer to side edges 26 can have a smaller bead thickness or shorter bead length, and beads 20" that are further from side edges 26, and closer to the center of the filter 10, can have a larger bead thickness, or in cases where beads 20 are defined by segments, beads 20" can have a longer bead or segment length. The different widths of beads 20' and beads 20" is schematically represented in FIG. 2.

The greater bead thickness and/or longer bead length segments toward the center of the filter can be advantageous as this is where the filter media is least supported by the frame, and therefore where it is most likely to be deformed by the pressure drop. Thus, the greater bead thicknesses and/or longer bead segment length in this area help to provide greater resistance to deformation where this resistance is most likely to be needed. Closer to sides 26 of the frame, the frame itself provides additional structural strength to the filter media, and in these locations less adhesive is needed and therefore less adhesive can be applied, which can be advantageous for using less material, for causing the filter overall to weigh less, and for potentially obscuring a smaller filter area of the filter media, that is, leaving more filter media open for filtering flow.

Figure 3:
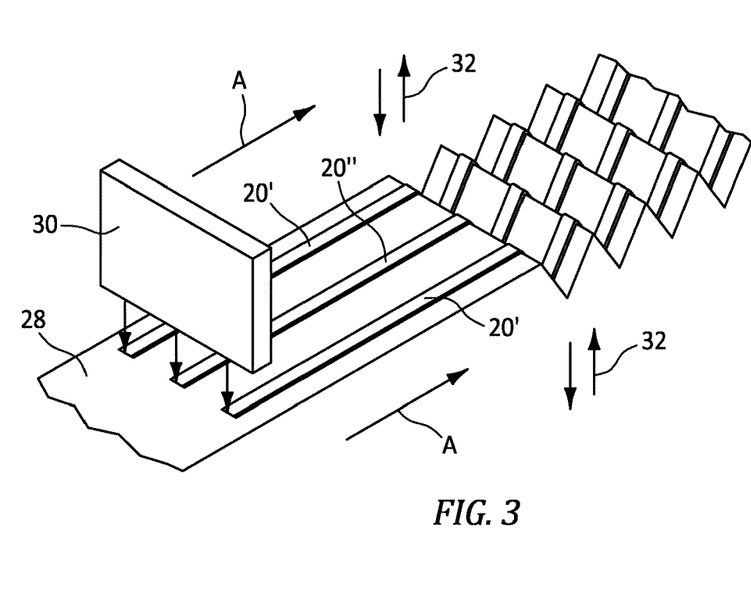
FIG. 3 schematically illustrates a method for making a filter according to another disclosed embodiment.

Turning to FIG. 3, a method for making filter 10 as disclosed herein is illustrated. A web, for example a continuous web of preferably substantially flat air filtration media 28 is moved along a series of manufacturing stops or stations to eventually make the filter pack 10 of FIGS. 1 and 2. These manufacturing stops can include scoring and embossing stations (not shown) where different shapes or structures are formed into the filter media before folding. In addition, these manufacturing stops can include scoring stations where a certain length of filter media can be cut or pre-cut to allow for the desired amount of filter media to be formed into a folded filter pack. These scoring stations can also score the intended fold lines of the filter media to further assist in the folding of the media into the intended folder filter pack.

In addition to these basic manufacturing stops, FIG. 3 shows, at the left side of the drawing, filtration media 28 moving in direction A to a glue application station 30. Media 28 then continues moving in the direction of arrows A, and travels from glue application station 30 to a folding station 32 (schematically illustrated) wherein the filtration media with applied glue or adhesive is folded substantially perpendicular to the adhesive lines to form the zig zag pattern discussed above, wherein the adhesive beads hold adjacent peaks or pleats of the filter pack together.

As mentioned above, other potential manufacturing stations along the path of media 28 can include cutting or scoring stations to assist in folding, and to separate a desired length of filter media to be formed into a folded filter pack. The cutting into desired lengths can be done before or after the folding step as desired.

In addition to the scoring stations mentioned above, such stops or stations can also include embossing stations where in some instances embossings can be made to filer media parallel to the direction of travel A. Such embossings can pass through the plane of the material to extend to both sides of the material such that, when folded, these embossings are closer to parallel, or are parallel, which can help to establish good contact and hold for the beads of adhesive. Thus, in such embodiments, glue beads can be applied along such embossings. The illustration of FIG. 3 shows flat walls for the sake of simplicity, but various embossings can be added to the walls, well within the scope of the claimed invention.

Glue application station 30 is configured to apply separate parallel beads of adhesive to the filtration media, and can have glue nozzles that can be independently controlled so as to control the amount of adhesive or glue bead being applied by each nozzle. Such variable flow adhesive nozzles are known to persons skilled in the art, and the specific structure of such nozzles is not further disclosed herein. Glue application station 30 could have a number of parallel spaced nozzles laterally spaced relative to the moving media 28 such that each nozzle applies an adhesive bead profile where desired in the resulting folded filter pack. The different nozzles can be controlled to apply different flow rates and, therefore, different thicknesses, different lengths and different profiles of adhesive beads to filter media 28. This results in different adhesive beads having different thickness or diameter and or different segment lengths.

In the illustrated embodiment, only three (3) glue beads are being applied, and a center bead 20" can be of greater thickness, or if beads 20', 20" are defined by segments, then center bead 20" can have longer segments than the side beads 20' each of which is close to edges of the filtration media 28 and thus will be close to sides 26 of a frame 12 once assembly of the filter 10 is completed. This is advantageous as once the filter pack is mounted in a frame as in FIG. 2, less hold is needed close to walls 26 of the frame since these walls already capture and reinforce the folded walls. Thus, a different bead thickness and/or segment length can be applied, for example depending upon how much hold force is needed, and in the case illustrated, side beads 20' have a smaller width and/or length of glue bead segments than the centered glue bead 20". In this configuration, it may be desirable to have side beads 20' be thinner and/or shorter than centered glue bead 20" by between about 10-70%.

As set forth above, glue nozzles with appropriate control mechanisms are known to persons skilled in the art and can be used to apply glue beads having different thicknesses and length as disclosed herein. Further, these variable flow glue or adhesive nozzles can be controlled by a control unit combining hardware and software to allow a user to set the desired flow patterns from each flow nozzle to produce a desired configuration of adhesive bead thicknesses, and/or beads defined by segments of different length, or beads defined by alternating dots and segments which themselves can have different thickness and/or length.

Figure 4:
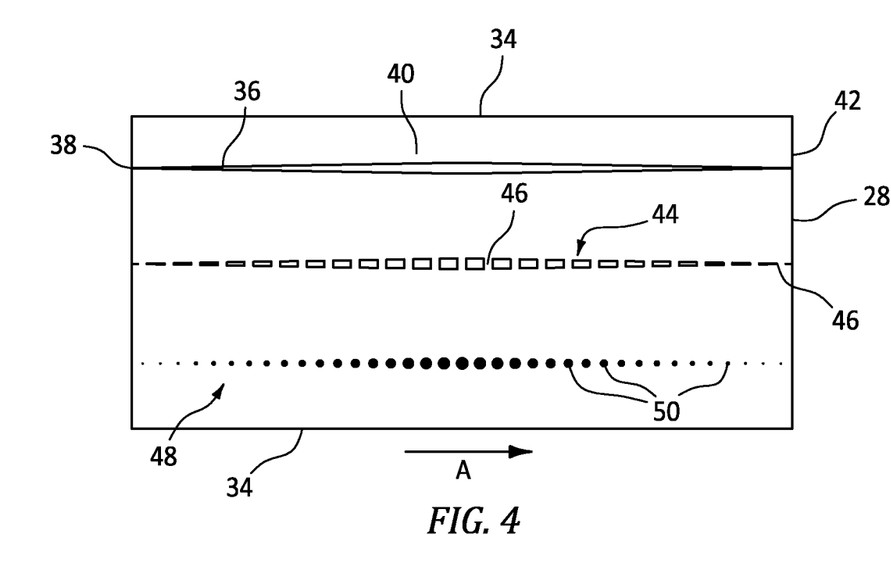
FIG. 4 schematically illustrates different configurations of possible adhesive threads or beads.

FIG. 4 is a schematic top view of a moving segment of media 28 and illustrates different adhesive thread or bead patterns or profiles that can be useful with the configurations disclosed herein. Different types of beads are illustrated in the same media 28 for the sake of illustration of different embodiments, but these different types of beads could be used individually or in combinations with others, and the illustration of FIG. 4 is not intended to require a specific combination of thread types.

In FIG. 4, sides of media 28 that will eventually be parallel to sides 26 of frame 12 are shown at 34. In the first thread 36 shown in FIG. 4, a configuration is illustrated wherein the thread 36 extends along the length of media 28 that is intended to be in a filter pack, and the bead thickness starts thin at the left side 38 of the illustration, gets gradually thicker at the center area 40, and then gradually reduces in thickness as it reaches the right side 42 of the illustration.

In a second configuration illustrated in FIG. 4, a thread 44 can be applied in thread segments 46 that are spaced along the length of media 28. This can be done in some instances to reduce the amount of adhesive to be used. In this configuration, the same gradually increasing thickness toward center 40 can be applied as discussed above with respect to thread 36. Further, this configuration and all others illustrated in FIG. 4 could be employed in the thread thickness configuration of the embodiment of FIGS. 1-2, wherein thread thickness is greater in threads that are centered with respect to sides 34 than it is in threads near sides 34.

In a third configuration shown in FIG. 4, a third configuration or profile of thread 48 is illustrated wherein adhesive can be applied in a series of dots 50, again for purposes of saving on adhesive use if appropriate to an end use of the resulting filter. Further, the same considerations apply in that this type of thread 48 can be made thicker in center areas between sides 34 and thinner closer to sides 34, and can also be applied in greater thickness along thread 48 such that dots 50 in center 40 are thicker than dots 50 at the left or right sides 38, 42. It should also be appreciated that combinations of the profiles shown in FIG. 4 can be combined in the same filter, for example with a solid bead of thread in center areas and dots near side edges, as one non-limiting example. Furthermore, these different profiles can be combined in the same line as well, for example in a thread bead that could be defined by alternating segments and dots, as one non-limiting example.

Figure 5:
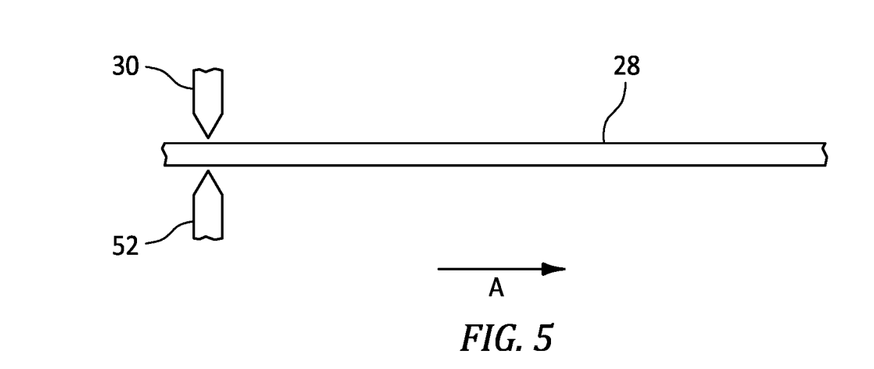
FIG. 5 schematically illustrates a filter media having adhesive applied on both sides.

As mentioned above, adhesive threads or beads can be applied to both sides of media 28 such that the filter pack 14, once folded, has adhesive on both upstream and downstream sides, and preferably joining both upstream and downstream facing peaks 18. FIG. 5 schematically illustrates media 28 moving along path A between an upper variable flow adhesive station 30 which applies the desired adhesive threads to one side of media 28, and also a lower variable flow adhesive station 52 which applies the desired adhesive threads to the other side of media 28. FIG. 5 shows these applications aligned to be done simultaneously but it should be appreciated that they could be conducted serially along path A as well. Further, FIG. 5 is presented as a horizontal application, and of course steps should be taken in this instance to be sure that adhesive does not fall from the lower facing side of media 28 as it is applied. This can be done by using adhesive that is sufficiently viscous that it remains in place until folding. Alternatively, the process could also be conducted in a vertical arrangement, wherein the adhesive stations would be laterally spaced on either side of a vertically oriented media 28.

In the configuration wherein adhesive is applied on both sides, it can be desirable to apply different adhesive thicknesses on the different sides of media 28. For example, it may be desirable to apply a greater adhesive thickness on the side of media 28 that is eventually to face downstream when assembled into a filter 10, as this is where greater resistance to deformation from pressure drop can be most effective. With horizontal media as illustrated in FIG. 5, it may be desirable to apply a greater amount of adhesive on the upwardly facing surface, and then to fold filter media such that this surface is the downstream facing surface. This limits the amount of adhesive to be applied by station 52 on the downwardly facing surface such that adhesive dropping off of media 28 is less of a problem, and the greater adhesive amounts for greater hold wind up on the downstream, side of the as desired.

Figures 6, 7:
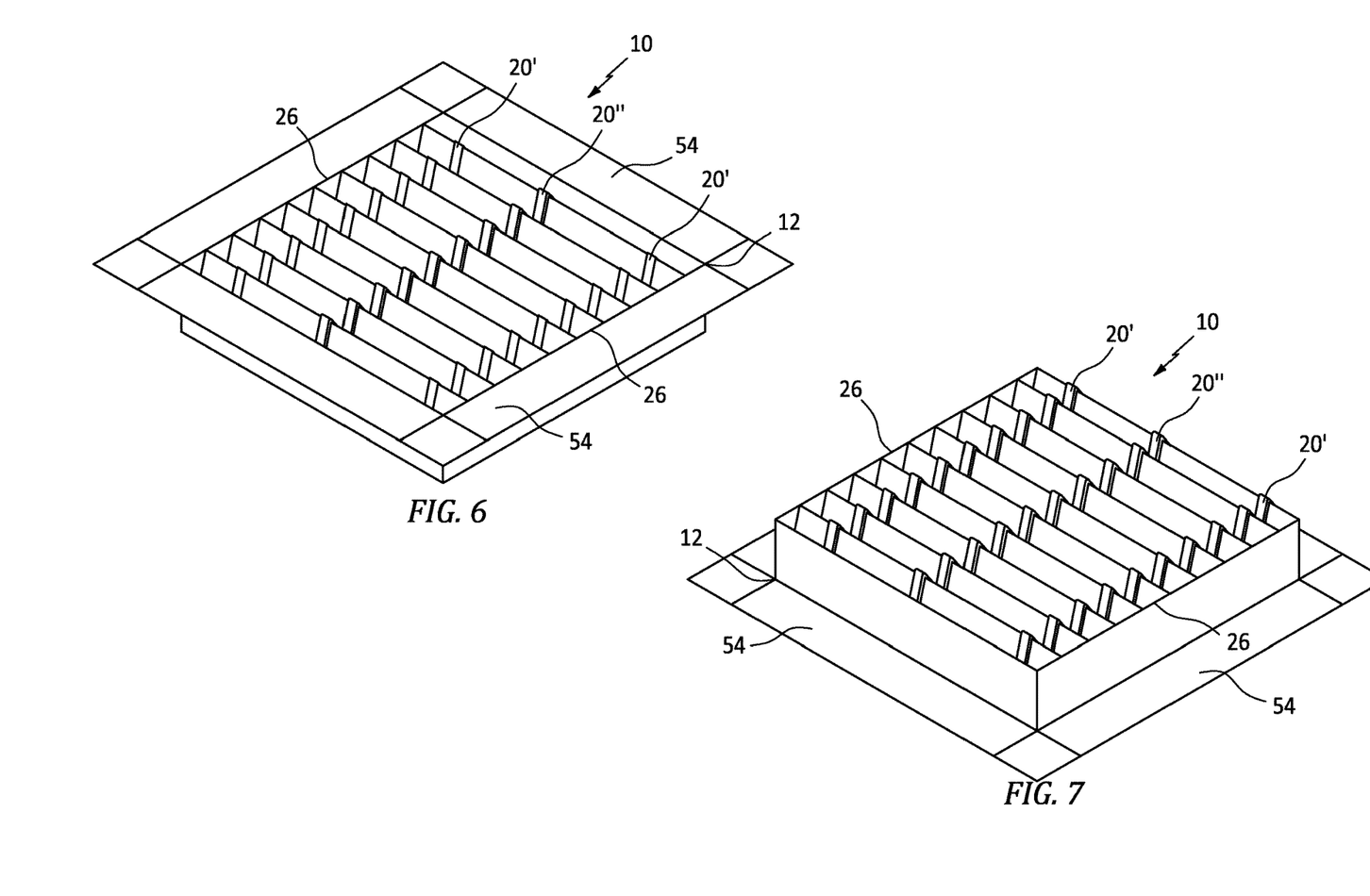
FIG. 6 illustrates an upstream facing side of a filter according to the invention.
FIG. 7 illustrates a downstream facing side of a filter according to the invention.

FIGS. 6 and 7 schematically illustrate upstream and downstream facing sides of a filter 10 with different adhesive thicknesses configured as described above. FIG. 6 shows an upstream facing side of filter 10, wherein frame 12 has extending flanges 54 that can be used to secure the filter in an HVAC system (not shown). Folded filter pack 14 has adhesive threads 20' that are close to walls 26, and an adhesive thread 20" that is closer to the center between walls 26, and thread 20" in this configuration has a greater thickness than threads 20'. It should again be appreciated that for simplicity, FIG. 6 shows only three threads, including a central thick thread and two side threads of lesser thickness. A filter might instead have a much greater number of threads, and these threads could have a gradually increasing thickness from one side toward the center, and then a gradually decreasing thickness from the center toward the other side. Further, the actual threads could have uniform thickness along the length of each thread as shown, or could have different thickness, segments and/or dots as illustrated and described with respect to FIG. 4.

FIG. 7 shows the downstream side of the filter 10 of FIG. 6 and shows similar features to those visible in FIG. 6. Further, as discussed above, the threads on the downstream side of filter 10 (FIG. 7) can be thicker than the correspondingly positioned threads on the upstream side of filter 10 (FIG. 6).

It should be appreciated that although the exemplary drawings show the smaller sized glue beads closer to side walls of the frame, there are other embodiments wherein more or less strength can be needed in different locations. For those situations, of course the glue bead thickness can be adjusted to use the least glue where possible.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. Thus, the scope of the present claims is not specifically limited by the details of specific embodiment disclosed herein, but rather the claims define the full and reasonable scope of the invention.

I claim:

1. An air filter, comprising:
   an air filter pack comprising air filtration media folded along fold lines to define adjacent walls separated by connecting peaks at the fold lines; and
   a plurality of adhesive beads extending substantially perpendicular to the fold lines, wherein the plurality of adhesive beads have different bead thicknesses and/or segment lengths, wherein the different bead thicknesses are different at parallel locations located along the fold lines.

2. The air filter of claim 1, wherein the plurality of adhesive beads have different bead thicknesses.

3. The air filter of claim 1, wherein the plurality of adhesive beads join adjacent peaks together.

4. The air filter of claim 1, wherein the air filter pack is enclosed in a frame having walls, and wherein adhesive beads of the plurality of adhesive beads that are closer to the walls of the frame have a smaller bead thickness than those that are further from the walls of the frame.

5. The air filter of claim 4, wherein the walls of the frame include a first pair of walls that extend generally parallel to the plurality of adhesive beads and a second pair of walls that extend generally perpendicular to the plurality of adhesive beads.

6. The air filter of claim 1, wherein the plurality of adhesive beads extend along a length from one edge of the filter pack parallel to the fold lines to an opposite edge of the filter pack parallel to the fold lines, and wherein each adhesive bead of the plurality of adhesive beads has a substantially constant thickness along the length.

7. The air filter of claim 1, wherein the plurality of adhesive beads extend along a length from one edge of the filter pack parallel to the fold lines to an opposite edge of the filter pack parallel to the fold lines, and wherein at least one adhesive bead of the plurality of adhesive beads has a thickness that changes along the length.

8. The air filter of claim 7, wherein the at least one adhesive bead has a thickness that is thinner close to the one edge or the opposite edge.

9. The air filter of claim 1, wherein the plurality of adhesive beads comprises continuous beads of adhesive extending along a length of the filter pack.

10. The air filter of claim 1, wherein the plurality of adhesive beads is defined by a row of dots, segments, or a combination thereof, of adhesive extending along a length of the filter pack.

11. The air filter of claim 1, wherein the air filter pack defines an upstream facing side and a downstream facing side, and wherein the plurality of substantially parallel beads extend along both the upstream facing side and the downstream facing side.

12. The air filter of claim 11, wherein the plurality of substantially parallel beads on the downstream facing side have a greater thickness than the plurality of substantially parallel beads on the upstream facing side.

13. A method for making an air filter, comprising applying a plurality of substantially parallel adhesive beads to a flat filter media, wherein the plurality of adhesive beads have different thicknesses or segment lengths from each other; and folding the flat air filtration media to form an air filter pack comprising air filtration media folded along fold lines to define adjacent walls separated by connecting peaks at the fold lines, wherein the plurality of adhesive beads extend substantially perpendicular to the fold lines and join adjacent peaks together, and wherein the adhesive beads have different bead thicknesses that are different at parallel locations located along the fold lines.

14. The method of claim 13, wherein the applying step is a continuous process conducted on a moving web of flat air filtration media having side edges, and wherein the plurality of adhesive beads extend along the moving web of flat air filtration media substantially parallel to the side edges.

15. The method of claim 14, wherein adhesive beads that are closer to the side edges have a smaller bead thickness than adhesive beads that are further from the side edges.

16. The method of claim 14, further comprising positioning the filter pack in a filter frame having parallel sides with respect to the adhesive beads, and perpendicular sides with respect to the adhesive beads, wherein adhesive beads that are closer to the parallel sides have a smaller bead thickness than adhesive beads that are further from the parallel sides.

17. The method of claim 13, wherein the applying step comprises applying the plurality of adhesive beads using variable flow adhesive nozzles.

18. The method of claim 13, wherein the thickness of the plurality of adhesive beads increases from one side edge to a center of the filter pack, and then decreases from the center to the other side edge of the filter pack.

19. The method of claim 13, wherein the plurality of adhesive beads extend along a length of the flat filter media from one edge of the flat filter media that is parallel to the fold lines to an opposite edge of the flat filter media that is parallel to the fold lines, and wherein each adhesive bead of the plurality of adhesive beads has a substantially constant thickness along the length.

20. The method of claim 13, wherein the plurality of adhesive beads extend along a length of the flat filter media from one edge of the flat filter media that is parallel to the fold lines to an opposite edge of the filter media that is parallel to the fold lines, and wherein each adhesive bead of the plurality of adhesive beads has a thickness that changes along the length.

21. The method of claim 13, wherein the at least one adhesive bead has a thickness that is thinner close to the one edge or the opposite edge than it is along central portions of the at least one adhesive bead.

22. The method of claim 13, wherein the plurality of adhesive beads comprises continuous beads of adhesive extending along a length of the filter pack.

23. The method of claim 13, wherein the plurality of adhesive beads is defined by a row of dots or segments of adhesive extending along a length of the filter pack.

24. The method of claim 13, wherein the air filter pack defines an upstream facing side and a downstream facing side, and wherein the plurality of substantially parallel beads extend along both the upstream facing side and the downstream facing side.

25. The method of claim 24, wherein the plurality of substantially parallel beads on the downstream facing side have a greater thickness than the plurality of substantially parallel beads on the upstream facing side.

* * * * *